United States Patent
Cankaya et al.

(10) Patent No.: US 7,991,016 B2
(45) Date of Patent: Aug. 2, 2011

(54) HIGH AVAILABILITY CLOCK SYNCHRONIZATION AND DISTRIBUTION FOR MOBILE BACKHAUL NETWORKS

(75) Inventors: Hakki Candan Cankaya, Dallas, TX (US); Kamakshi Sridhar, Plano, TX (US); Peter Roberts, Stittsville, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 53 days.

(21) Appl. No.: 12/349,441

(22) Filed: Jan. 6, 2009

(65) Prior Publication Data

US 2010/0172453 A1    Jul. 8, 2010

(51) Int. Cl.
*H04J 3/06* (2006.01)
(52) U.S. Cl. .......................................... 370/503; 370/216
(58) Field of Classification Search .................. 370/347, 370/512, 516, 510, 360, 458, 350, 394, 216, 370/442, 503
See application file for complete search history.

(56) References Cited

U.S. PATENT DOCUMENTS

| | | | | |
|---|---|---|---|---|
| 6,078,595 A * | 6/2000 | Jones et al. | | 370/503 |
| 6,965,558 B1 * | 11/2005 | Hann | | 370/216 |
| 7,136,388 B2 * | 11/2006 | Friedrichs et al. | | 370/395.62 |
| 7,613,212 B1 * | 11/2009 | Raz et al. | | 370/510 |
| 7,643,409 B2 * | 1/2010 | Voit et al. | | 370/218 |
| 7,649,912 B2 * | 1/2010 | Balasubramanian et al. | | 370/509 |
| 7,746,769 B2 * | 6/2010 | Shao et al. | | 370/228 |
| 7,782,764 B2 * | 8/2010 | Zi | | 370/218 |
| 7,826,495 B2 * | 11/2010 | Deng et al. | | 370/516 |
| 7,876,792 B2 * | 1/2011 | Wong et al. | | 370/518 |
| 2002/0080825 A1 * | 6/2002 | Wolf et al. | | 370/517 |
| 2004/0062278 A1 * | 4/2004 | Hadzic et al. | | 370/503 |
| 2006/0203851 A1 * | 9/2006 | Eidson | | 370/503 |
| 2007/0116060 A1 * | 5/2007 | Qu | | 370/503 |
| 2008/0089227 A1 * | 4/2008 | Guichard et al. | | 370/228 |
| 2009/0052431 A1 * | 2/2009 | Kroener et al. | | 370/350 |

* cited by examiner

*Primary Examiner* — Michael J Moore, Jr.
(74) *Attorney, Agent, or Firm* — Garlick Harrison & Markison (57) ABSTRACT

Fully redundant clock systems are provided on network nodes coupled by redundant multisegment psuedowires (MSPWs) within an internet-protocol (IP)-based mobile backhaul network. The primary clock system includes a primary master clock on a first node and a primary slave clock on a second node coupled via a primary MSPW, while the secondary clock system includes a secondary master clock on the first node and a secondary slave clock on the second node coupled via a secondary MSPW. The primary and secondary slave clocks synchronize with their respective primary and secondary master clocks via their respective MSPWs. A clock controller maintains the secondary clock system in a hot-standby mode, and upon determining that a switch-over is needed, automatically switches from the primary clock system to the secondary clock system.

21 Claims, 6 Drawing Sheets

HIGH AVAILABILITY CLOCK SYNCHRONIZATION AND DISTRIBUTION FOR MOBILE BACKHAUL NETWORKS

BACKGROUND OF THE INVENTION

1. Technical Field of the Invention

The present invention relates in general to clock synchronization, and in particular, to clock synchronization within mobile backhaul networks.

2. Description of Related Art

The wireless infrastructure market is migrating towards 3G, replacing traditional Base Transceiver Station (BTS) and Base Station Controller (BSC) elements with UMTS Node B (base station) and RNC network elements. With the migration towards 3G underway, the T1/E1 links traditionally connecting the BTS to the BSC are also being replaced with packet switched mobile backhaul networks that provide connectivity between the base station and the RNC. To deliver traditional T1/E1 voice and data service across the new IP-based mobile backhaul networks, pseudowires are often used. A pseudowire is an emulation of a native service, such as T1/E1, over a packet switched network (PSN), such as an IP-based Multi Protocol Label Switching (MPLS) network. Pseudowires emulate the operation of carrying the native service by segmenting, adapting and encapsulating the T1/E1 traffic into packets of the format required by the PSN.

The term "pseudowire" (PW) typically refers to a PSN tunnel that both originates and terminates on the same PSN. Thus, a PW passes through a maximum of one PSN tunnel between the originating and terminating Provider Edge (PE) routers. To extend the pseudowire service through multiple PSN tunnels (or multiple network segments), multi-segment pseudowires (MSPW) are used. A MSPW is a static or dynamically configured set of two or more contiguous PW segments that behave and function as a single point-to-point PW. Thus, a MSPW can be considered a single PW that is segmented into a number of concatenated hops.

Protection for the network connection between two PE routers (e.g., the RNC and the base station) within the IP-based mobile backhaul network is typically achieved by using a primary single PW or MSPW and one or more secondary PW or MSPWs on standby in order to provide redundancy. In addition, protection for the clock distribution network between the RNC and base station within the IP-based mobile backhaul network is typically achieved by providing both a primary master clock and a secondary master clock at the RNC, each of which is able to communicate with a slave clock on the base station.

However, there is currently no redundancy for the slave clocks. Therefore, upon a failure of the primary master clock on the RNC, the slave clock on the base station must resynchronize with the secondary master clock on the RNC. Likewise, upon a failure of the primary MSPW between the RNC and the base station, the slave clock must switch-over to the secondary MSPW. In both cases, the slave clock may drift from the system clock, potentially resulting in dropped calls in the mobile backhaul network.

In addition, there is a lack of delay and/or packet loss awareness for protection switching in redundant PW's that deliver clock synchronization. Degradation in performance of the primary PW can negatively affect not only the distribution of the clock, but also the synchronization of the entire clock system.

SUMMARY OF THE INVENTION

Embodiments of the present invention provide a network node within an internet protocol (IP)-based mobile backhaul network that includes a primary slave clock forming part of a primary clock system and a secondary slave clock forming part of a secondary clock system. The primary slave clock synchronizes with a primary master clock via a primary multi-segment pseudowire coupled between the network node and an additional network node on which the primary master clock is located. The secondary slave clock synchronizes with a secondary master clock on the additional network node via a secondary multi-segment pseudowire coupled between the network node and the additional network node. The network node further includes a clock controller operable to maintain the secondary clock system in a hot-stand-by mode, and upon determining that a switch-over is needed, to automatically switch from the primary clock system to the secondary clock system.

In further embodiments, the network node further includes a processor operable to determine when a switch-over from the primary clock system to the secondary clock system is needed and coupled to provide an instruction to the clock controller to perform the switch-over. In one embodiment, the processor provides the instruction to the clock controller to perform the switch-over upon detecting a failure of the primary clock system. In another embodiment, the processor provides the instruction to the clock controller to perform the switch-over upon detecting a failure of the primary multi-segment pseudowire.

In yet another embodiment, the processor is operable to monitor a performance metric of the primary clock system, and provides the instruction to the clock controller to perform the switch-over when the performance metric exceeds a threshold. For example, the performance metric can be a delay metric that measures a delay or delay variation over the primary multi-segment pseudowire or a loss metric that measures a loss over the primary multi-segment pseudowire.

In still a further embodiment, the processor monitors the performance metric on the primary multi-segment pseudowire and the secondary multi-segment pseudowire and provides the instruction to perform the switch-over when the performance metric on the primary multi-segment pseudowire exceeds the threshold and is greater than the performance metric on the secondary multi-segment pseudowire.

Embodiments of the present invention further provide a method for implementing a switch-over between clock systems within an IP-based mobile backhaul network. The method includes synchronizing a primary slave clock located on a first network node with a primary master clock located on a second network node via a primary multi-segment pseudowire coupled between the first and second network nodes, in which the primary slave clock and the primary master clock forming a primary clock system, and synchronizing a secondary slave clock on the first network node with a secondary master clock on the second network node via a secondary multi-segment pseudowire coupled between the first and second network nodes, in which the secondary slave clock and the secondary master clock forming a secondary clock system. The method further includes maintaining the secondary clock system in a hot-stand-by mode, monitoring the primary clock system, determining that a switch-over from the primary clock system to the secondary clock system is needed and automatically switching from the primary clock system to the secondary clock system.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
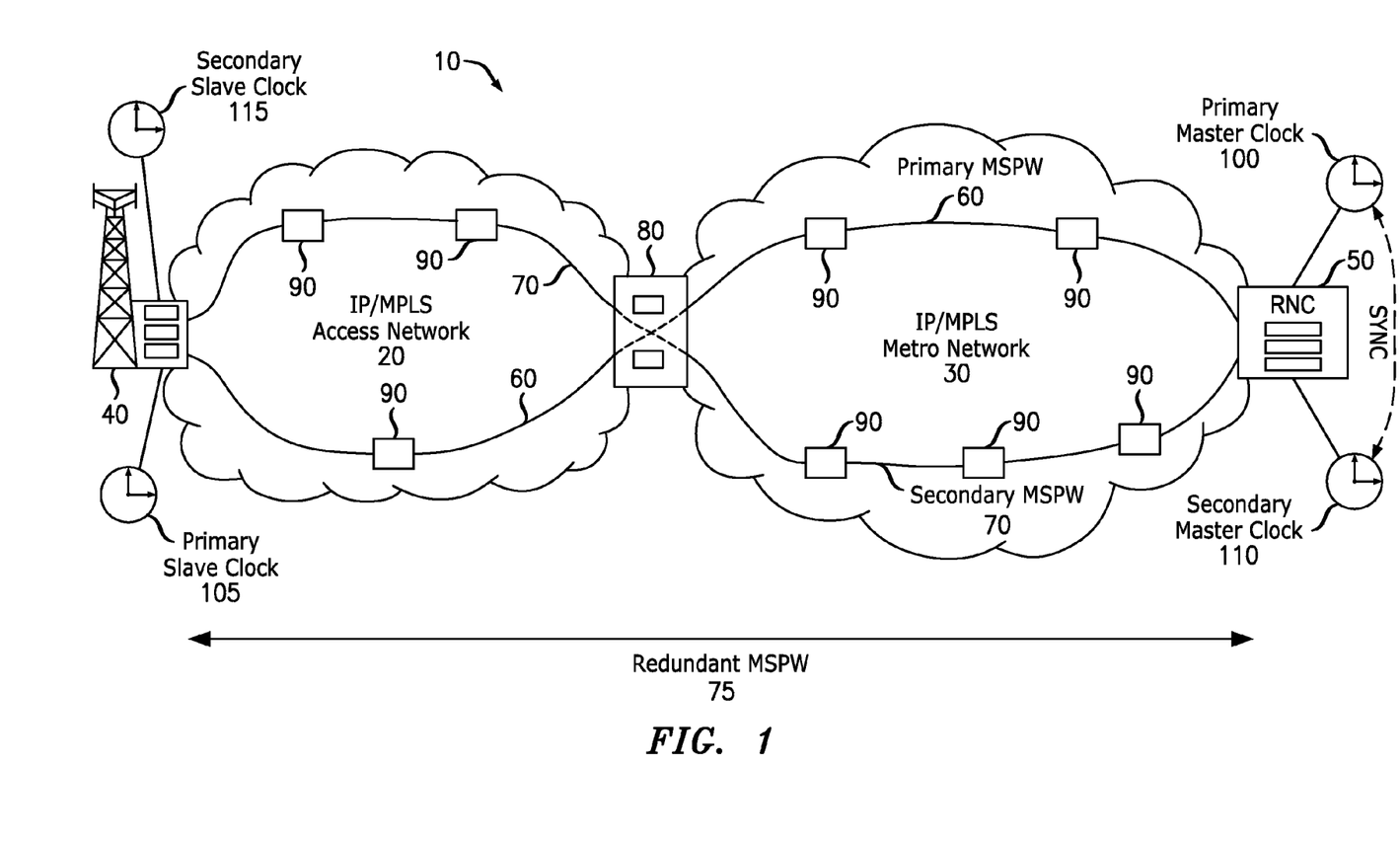
FIG. 1 illustrates an exemplary internet protocol (IP)-based mobile backhaul network with redundant multi-segment pseudowires and primary and secondary clock systems, in accordance with embodiments of the present invention.

FIG. 1 depicts an exemplary Internet Protocol (IP)-based mobile backhaul network 10 in accordance with embodiments of the present invention. The mobile backhaul network 10 couples a cell site 40 (e.g., a base station or Node B) to a Radio Network Controller (RNC) 50. The RNC 50 is the governing element in a Universal Mobile Telecommunications System (UMTS) radio access network (UTRAN), of which the RNC 50 and base station 40 form a part. The RNC 50 performs radio resource management, mobility management and data encryption for all of the base station's 40 (only one of which is shown) to which the RNC 50 is connected.

The mobile backhaul network 10 is segmented into an access network 20 and a metro network 30 that are connected via intermediate switching node 80. Each network 20 and 30 further includes one or more additional intermediate nodes 90. Thus, base station 40 and RNC 50 are connected via intermediate switching node 80 and one or more additional intermediate nodes 90. Within the IP-based mobile backhaul network 10, the base station 40 and RNC 50 function as terminating Provider Edge (T-PE) nodes, while the intermediate switching node 80 functions as a switching Provider Edge (S-PE) node.

To transport circuit-switched traffic (i.e., legacy voice, data and signaling) between the base station 40 and the RNC 50, multi-segment pseudowires (MSPWs) 60 and 70 are used. Each MSPW 60 and 70 is coupled between the RNC 50 and the base station 40 via the intermediate switching node 80 and one or more respective additional intermediate nodes 90. Each MSPW 60 and 70 operates to emulate the circuit-switched traffic over the packet-switched IP-based mobile backhaul network 10. One of the MSPWs 60 is the primary MSPW that is active for the connection and the other MSPW 70 is the secondary MSPW that remains on standby in case the primary MSPW 60 fails. As such, the primary and secondary MSPWs 60 and 70 together form an end-to-end redundant connection 75 between the base station 40 and the RNC 50. The redundant MSPW 75 enables a high availability (i.e., at or above five 9's) to be provided to customers of the base station 40.

In addition to the redundant MSPW 75, in accordance with embodiments of the present invention, high availability is also achieved by providing a fully redundant clock system. The fully redundant clock system includes a primary master clock 100 and a secondary master clock 110 on the RNC 50 and a primary slave clock 105 and secondary slave clock 110 on the base station 40. The primary master clock 100 and primary slave clock 105 form a primary clock system, while the secondary master clock 110 and secondary slave clock 115 form a secondary clock system. The primary master clock 100 is coupled to the primary slave clock 105 via the primary MSPW 60, while the secondary master clock 110 is coupled to the secondary slave clock 115 via the secondary MSPW.

Thus, clock synchronization messages are transmitted from the primary master clock 100 to the primary slave clock 105 over the primary MSPW and clock synchronization messages are transmitted from the secondary master clock 110 to the secondary slave clock 115 over the secondary MSPW 70. As such, the secondary clock system can operate in a hot-stand-by mode having its slave clock 115 already synchronized to its master clock 110 using its own MSPW 70, so that in case of any failure in the primary clock system (i.e., a failure of the primary master clock 100, primary slave clock 105 or primary MSPW 60), a simple switch-over from the primary clock system to the hot-stand-by secondary clock system can occur without requiring any resynchronization of the secondary clock system. Furthermore, the primary master clock 100 can be synchronized with the secondary master clock 110 to enable a seamless transition upon a switch-over to the secondary clock system. Therefore, there is no delay difference after a switch-over from the primary clock system to the hot-stand-by secondary clock system.

Figure 2:
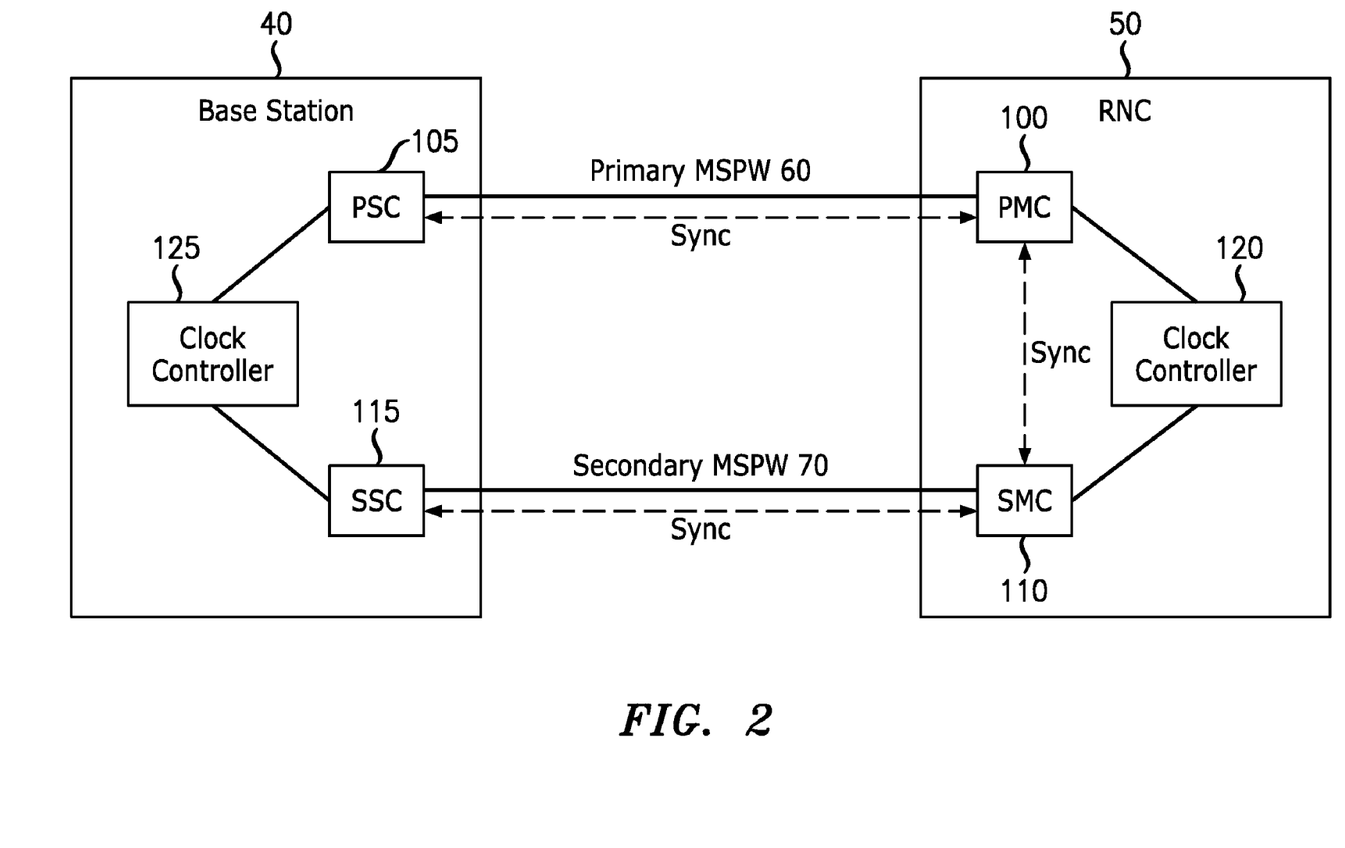
FIG. 2 illustrates synchronization of the primary and secondary clock systems, in accordance with embodiments of the present invention.

FIG. 2 illustrates synchronization of the primary and secondary clock systems, in accordance with embodiments of the present invention. As shown in FIG. 2, the primary master clock (PMC) 100 and secondary master clock (SMC) 110 are both within the RNC 50, while the primary slave clock (PSC) 105 and secondary slave clock (SSC) 115 are both within the base station 40. The PMC 100 and PSC 105 are connected via the primary MSPW 60, such that synchronization messages are transmitted therebetween over the primary MSPW 60. In addition, the SMC 110 and SSC 115 are connected via the secondary MSPW 70, such that synchronization messages are transmitted therebetween over the secondary MSPW 70. Furthermore, both the PMC 100 and SMC 110 can be synchronized with each other within the RNC 50.

Each of the RNC 50 and base station 40 further includes a respective clock controller 120 and 125 for controlling their respective clocks. For example, clock controller 120 controls the PMC 100 and SMC 110 to ensure that the PMC 100 remains synchronized with the PSC 105 and the SMC 110 remains synchronized with the SSC 115. Likewise, clock controller 125 controls the PSC 105 and SSC 114 to ensure that the PMC 100 remains synchronized with the PSC 105 and the SMC 110 remains synchronized with the SSC 115. Therefore, the clock controllers 120 and 125 are responsible for operating the secondary clock system (SMC 110 and SSC 115) in a hot-stand-by mode by making sure the SSC 115 is synchronized to the SMC 110 using the secondary MSPW 70.

In addition, the clock controllers 120 and 125 operate in conjunction with one another to perform a switch-over from the primary clock system to the secondary clock system upon detecting a failure of the primary clock system. For example, if the PMC 100, PSC 105 or primary MSPW 60 fails, clock controllers 120 and 125 are configured to be notified of this failure and to switch to the secondary clock system by sending control messages therebetween over the secondary MSPW 70 to initiate the secondary clock system.

In accordance with further embodiments of the present invention, failure of the primary clock system is not the only factor used when considering whether a switch-over from the primary clock system to the secondary clock system is needed. Critical congestion and/or performance degradation in the IP-based mobile backhaul network 10 can also be used as switch-over triggers. For example, one or more performance metrics, including, but not limited to, delay, delay variation, packet loss or some combination thereof, can be monitored, and if the performance metric(s) indicate that significant degradation in the primary MSPW is occurring, a switch-over from the primary clock system to the secondary clock system is triggered.

Figure 3:
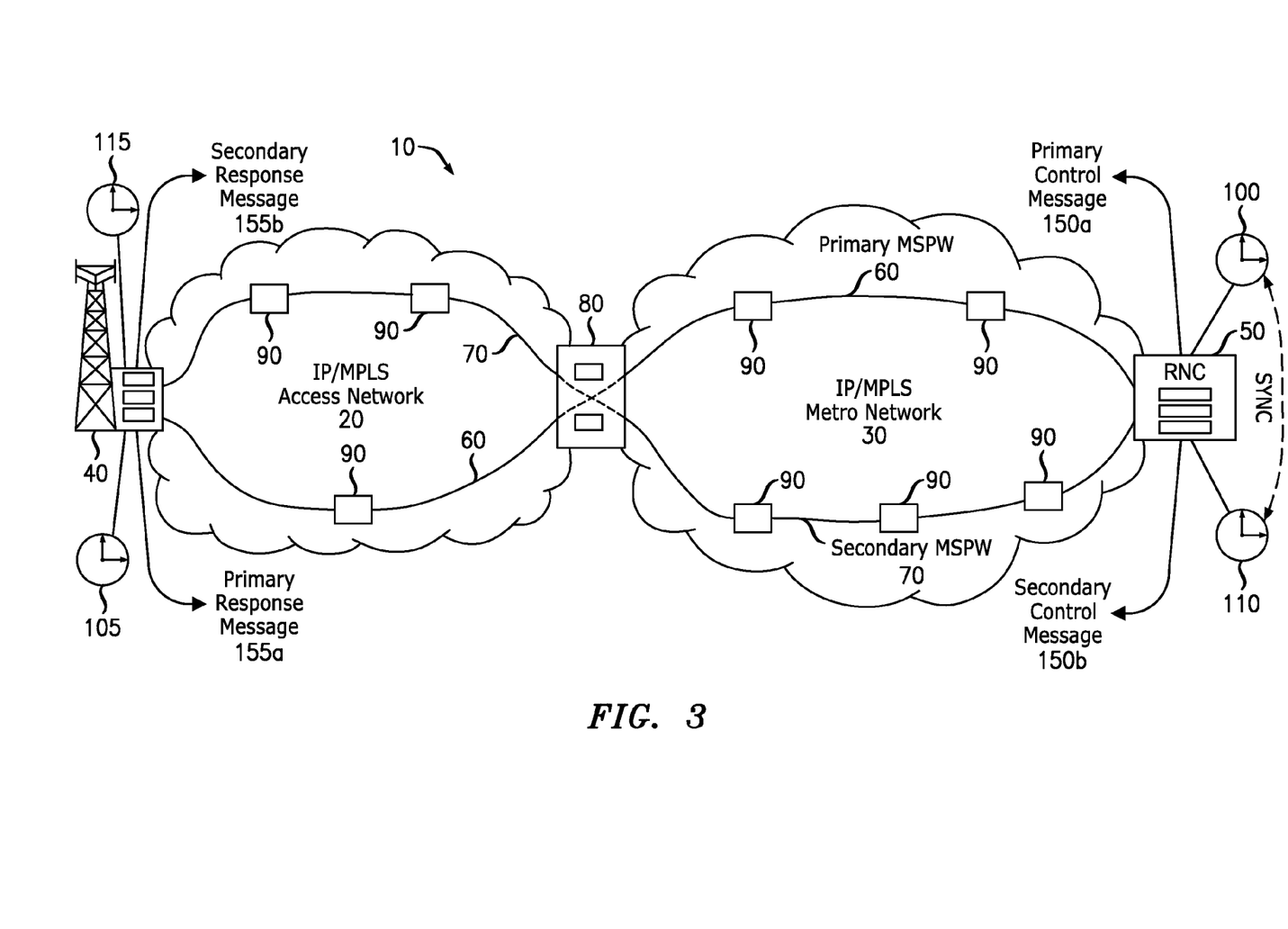
FIG. 3 illustrates exemplary messaging within an IP-based mobile backhaul network for use in measuring a performance metric of the primary and/or secondary clock systems, in accordance with embodiments of the present invention.

For example, referring now to FIG. 3 of the drawings, to facilitate monitoring of one or more performance metrics within the mobile backhaul network 10, the RNC 50 can be configured to generate and transmit a respective control message 150a and 150b along the primary and secondary multi-segment pseudowires 60 and 70. The control messages 150a and 150b solicit appropriate respective response messages 155a and 155b from the base station 40. The delivery performance of and/or information included in the control messages 150a and 150b and response messages 155a and 155b can be used to ascertain the performance degradation in the network 10. For example, the performance of and/or information contained in the control messages 150a and 150b, response messages 155a and 155b or some combination of messages can be used to calculate one or more performance metrics, such as a loss metric that measures the loss in the network or a delay metric that measures the delay and/or delay variation in the network.

The control messages 150a and 150b can be sent on-demand to confirm the fact that the customer is experiencing high availability or proactively or periodically to check the availability of the connection. For example, for on-demand loss measurements, loss measurement messages 150a and 150b can be sent from the RNC 50 to the base station 40 and loss measurement reply messages 155a and 155b can be sent from the base station 40 to the RNC 50 (and/or vice-versa). The loss measurement messages 150a and 150b request the receiving network node to provide an indication of the loss experienced by that receiving network node on both the primary and secondary MSPWs 60 and 70 within the loss measurement reply messages 155a and 155b that are sent back to the originating network node. The indication of loss can be, for example, a percentage or number of lost packets over a previous time period.

For proactive loss measurements, connectivity messages can be sent by both the RNC 50 and base station 40, with transmit (Tx)/receive (Rx) counters at the RNC 50 and base station 40 to count the number of connectivity messages sent and received therebetween to enable real-time measurements of the packet loss on the MSPWs 60 and 70. As another example, for delay and/or delay variation measurements, either on-demand or proactively, delay measurement messages 150a and 150b can be sent from the RNC 50 to the base station 40 and delay measurement reply messages 155a and 155b can be sent from the base station 40 to the RNC 50 (and/or vice-versa).

In an exemplary embodiment, each control message 150a and 150b is a multiprotocol label switching (MPLS) label switched path (LSP) virtual circuit verification (VCCV) message, and each of the response messages 155a and 155b is an MPLS LSP VCCV response message. VCCV is a fault detection and diagnostic tool for pseudowire applications that provides a control channel between two T-PE nodes in order to verify the connectivity of a pseudowire between the two T-PE nodes. To create the MPLS LSP VCCV message, an MPLS LSP message is encapsulated into a VCCV packet. The VCCV packet is then sent either out-of-band or as in-band traffic with the MSPW's 60 or 70 data. In either case, the VCCV traffic is not forwarded past the destination T-PE (base station 40 or RNC 50).

Figure 4:
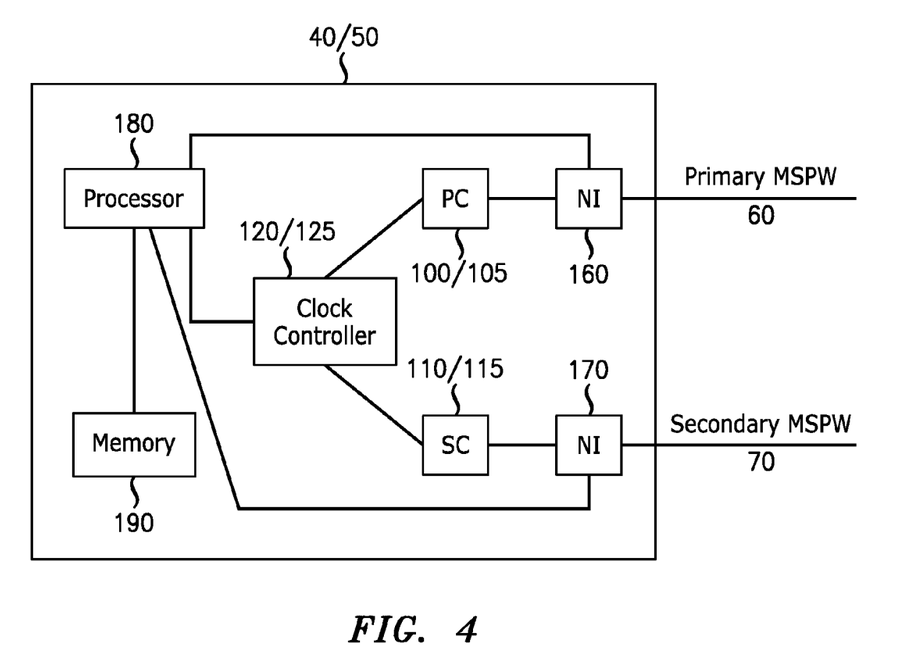
FIG. 4 is a block diagram of an exemplary network node within the IP-based mobile backhaul network for facilitating an automatic switch-over between the primary and secondary clock systems, in accordance with embodiments of the present invention.

Turning now to FIG. 4, there is illustrated an exemplary network node 40/50 within the IP-based mobile backhaul network for facilitating an automatic switch-over between the primary and secondary clock systems, in accordance with embodiments of the present invention. In one embodiment, the network node 50 is a Radio Network Controller (RNC), as shown in FIGS. 1-3. In another embodiment, the network node is a base station 40, as shown in FIGS. 1-3.

The network node 40/50 includes respective network interfaces 160 and 170, a primary clock (PC) 100/105 (i.e., 100 in the case where the network node is a base station 40; 105 in the case where the network node is an RNC 50), a secondary clock (SC) 110/115, a clock controller 120/125, a processor 180 and a memory 190. Network interface 160 is coupled to the IP-based mobile backhaul network to send and receive messages to and from other network nodes along the primary MSPW 60, while network interface 170 is coupled to the IP-based mobile backhaul network to send and receive messages to and from other network nodes along the secondary MSPW 70. For example, such messages can include the control messages 150a and 150b and/or response messages 155a and 155b shown in FIG. 3.

The processor 180 may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions stored in memory 190. The memory 190 may be a single memory device or a plurality of memory devices. Such a memory device may be a read-only memory, random access memory, volatile memory, non-volatile memory, static memory, dynamic memory, flash memory, and/or any device that stores digital information, such as operational instructions. Note that when the processor 180 implements one or more of its functions via a state machine, analog circuitry, digital circuitry, and/or logic circuitry, the memory 190 storing the corresponding operational instructions is typically embedded with the circuitry comprising the state machine, analog circuitry, digital circuitry, and/or logic circuitry.

The processor 180 is operable to detect failure of the primary system based on periodic checks of one or more of primary clock 100/105, primary MSPW 60, reports from the primary clocks 100/105 or some combination thereof, and to provide an instruction to the clock controller 120/125 to switch-over to the secondary clock system upon detecting the failure. In addition, the processor 180 is operable to detect degradation in the performance of the primary system (clock system and primary MSPW 60) based on the operational instructions stored in memory 190. For example, the processor 180 can generate the control messages 150a and 150b and/or response messages 155a and 155b for transmission to other network nodes via network interfaces 160 and 170 along primary and secondary MSPWs 60 and 70, respectively, within the IP-based mobile backhaul network. In addition, the processor 180 is coupled to receive the messages (control or response) generated by other network nodes from the network interfaces 160 and 170.

In embodiments in which the processor 180 is measuring the loss in the network, the control/response messages are either loss measurement/reply messages or connectivity messages. In an exemplary operation using connectivity messages, upon receiving a connectivity message on either network interface 160 or network interface 170 via primary MSPW 60 or secondary MSPW 70, respectively, the processor 180 increments an Rx counter associated with that network interface 160 or 170. Likewise, upon transmitting a connectivity message on either primary MSPW 60 or secondary MSPW 70 via network interface 160 or network interface 170, respectively, the processor 180 increments a Tx counter associated with that network interface 160 or 170. After a predetermined period of time, the processor 180 compares the value of each of the Rx counters to the values of the Tx counters maintained at the other network node and vice-versa to determine the amount of loss in the network (i.e., the number or percentage of connectivity packets that were lost within the predetermined period of time on the primary MSPW 60 and the secondary MSPW 70).

Once the number or percentage of lost packets on both the primary MSPW 60 and secondary MSPW 70 is determined by the processor 180, the processor 180 compares the measured loss values with one or more threshold values stored in memory 190. For example, the processor 180 can compare the percentage of lost packets on the primary MSPW 60 with an acceptable percentage threshold for the primary MSPW 60, and if the percentage of lost packets exceeds the acceptable percentage threshold, the processor 180 can provide an instruction to the clock controller 120/125 to switch-over to the secondary clock system.

As another example, the processor 180 can compare the percentage of lost packets on the primary MSPW 60 with a minimum acceptable percentage threshold for the primary MSPW 60, and if the percentage of lost packets exceeds the acceptable percentage threshold, the processor 180 can compare the percentage of lost packets on the secondary MSPW 70 with another minimum acceptable percentage threshold for the secondary MSPW 70, which can be the same as or different than the minimum acceptable percentage threshold for the primary MSPW 60. If the percentage of lost packets on the secondary MSPW 70 is less than the minimum acceptable percentage threshold for the secondary MSPW 70, the processor 180 can instruct the clock controller 120/125 to switch-over to the secondary clock system. Otherwise, the processor 180 maintains the primary clock system as the active clock system.

In another embodiment, the percentage of lost packets on the secondary MSPW 70 can be compared to the percentage of lost packets on the primary MSPW 60, and if the percentage of lost packets on the secondary MSPW 70 is less than the percentage of lost packets on the primary MSPW 60, the processor 180 can instruct the clock controller 120/125 to switch-over to the secondary clock system.

In embodiments in which the processor 180 is measuring the delay or delay variation in the network, the control/response messages are delay measurement/reply messages. In an exemplary operation, upon receiving a delay measurement/reply message on either network interface 160 or network interface 170 via primary MSPW 60 or secondary MSPW 70, respectively, the processor 180 can determine the delay information (e.g., the amount of delay or delay variation experienced on that MSPW 60 or 70) by either measuring the delay or delay variation associated with the received message or retrieving the delay information contained within the message, and may store the delay information in memory 190. Once the delay information is received on both the primary MSPW 60 and the secondary MSPW 70, the processor 180 retrieves the delay information from memory 190 and compares the measured delay values with one or more threshold values stored in memory 190. For example, the processor 180 can compare the measured delay on the primary MSPW 60 with an acceptable delay threshold for the primary MSPW 60, and if the measured delay exceeds the acceptable delay threshold, the processor 180 can provide an instruction to the clock controller 120/125 to switch-over to the secondary clock system.

As another example, if the measured delay exceeds the acceptable delay threshold, the processor 180 can compare the measured delay on the secondary MSPW 70 with another acceptable delay threshold for the secondary MSPW 70, which can be the same as or different than the acceptable delay threshold for the primary MSPW 60. If the measured delay on the secondary MSPW 70 is less than the acceptable delay threshold for the secondary MSPW 70, the processor 180 can instruct the clock controller 120/125 to switch-over to the secondary clock system. In another embodiment, the measured delay on the secondary MSPW 70 can be compared to the measured delay on the primary MSPW 60, and if the measured delay on the secondary MSPW 70 is less than the measured delay on the primary MSPW 60, the processor 180 can instruct the clock controller 120/125 to switch-over to the secondary clock system.

Figure 5:
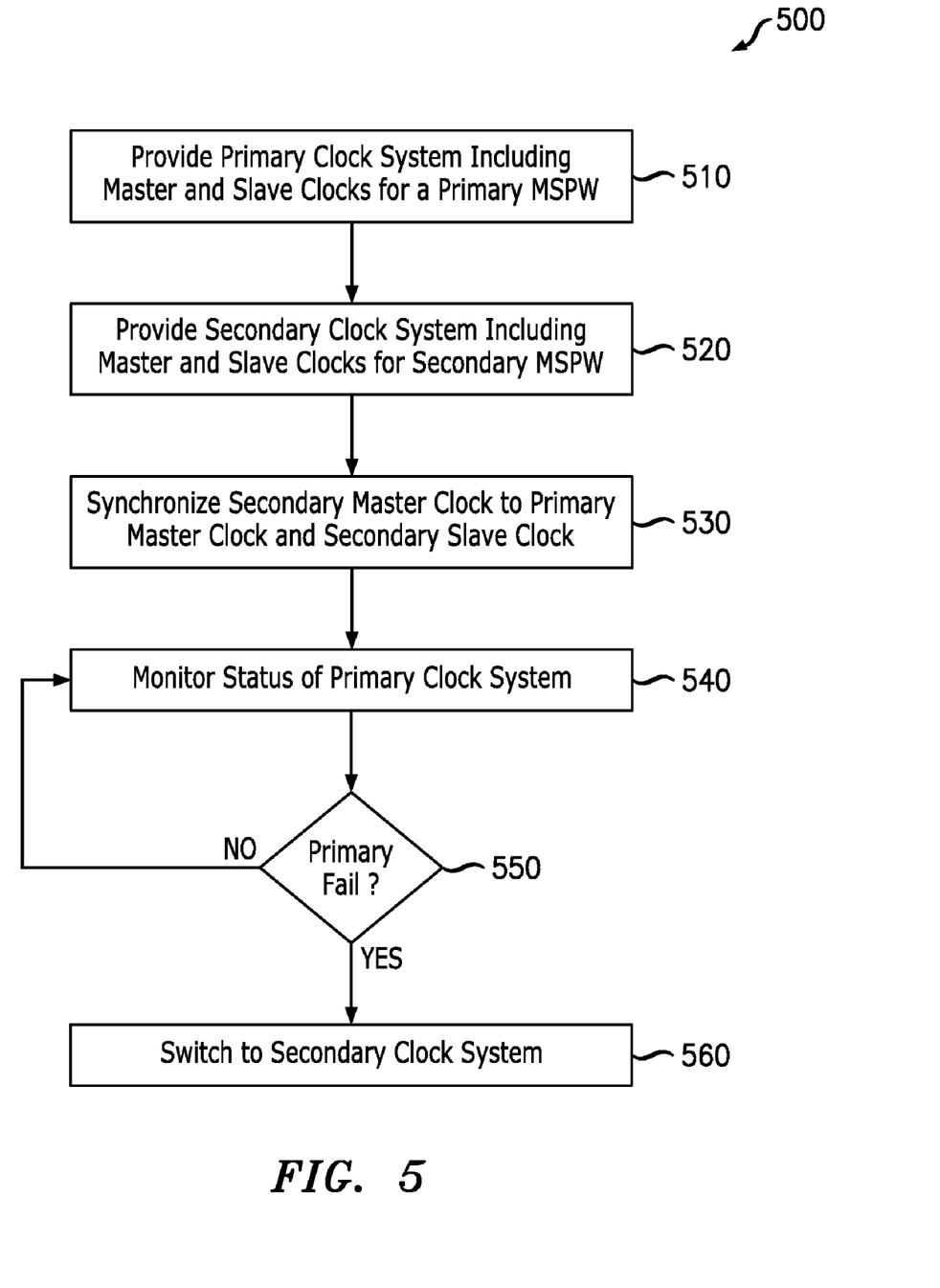
FIG. 5 is a flowchart illustrating an exemplary method for implementing the switch-over between the primary and secondary clock systems, in accordance with embodiments of the present invention.

FIG. 5 is a flowchart illustrating an exemplary method 500 for implementing a switch-over between clock systems within an IP-based mobile backhaul network, in accordance with embodiments of the present invention. Initially, at block 510, a primary clock system is provided for a primary MSPW. The primary clock system includes a master clock located on a first network node and a slave clock located on a second network node, in which the first and second network nodes are coupled via the primary MSPW. At block 520, a secondary clock system is provided for a secondary MSPW. The secondary clock system includes a master clock located on the first network node and a slave clock located on the second network node, in which the first and second network nodes are also coupled via the secondary MSPW.

At block 530, the secondary master clock and secondary slave clock are synchronized with each other. In addition, the secondary master clock may be synchronized with the primary master clock. At block 540, the status of the primary clock system is monitored, and if, at block 550, the primary clock system (or primary MSPW) fails, at block 560, a switch-over to the secondary clock system is performed.

Figure 6:
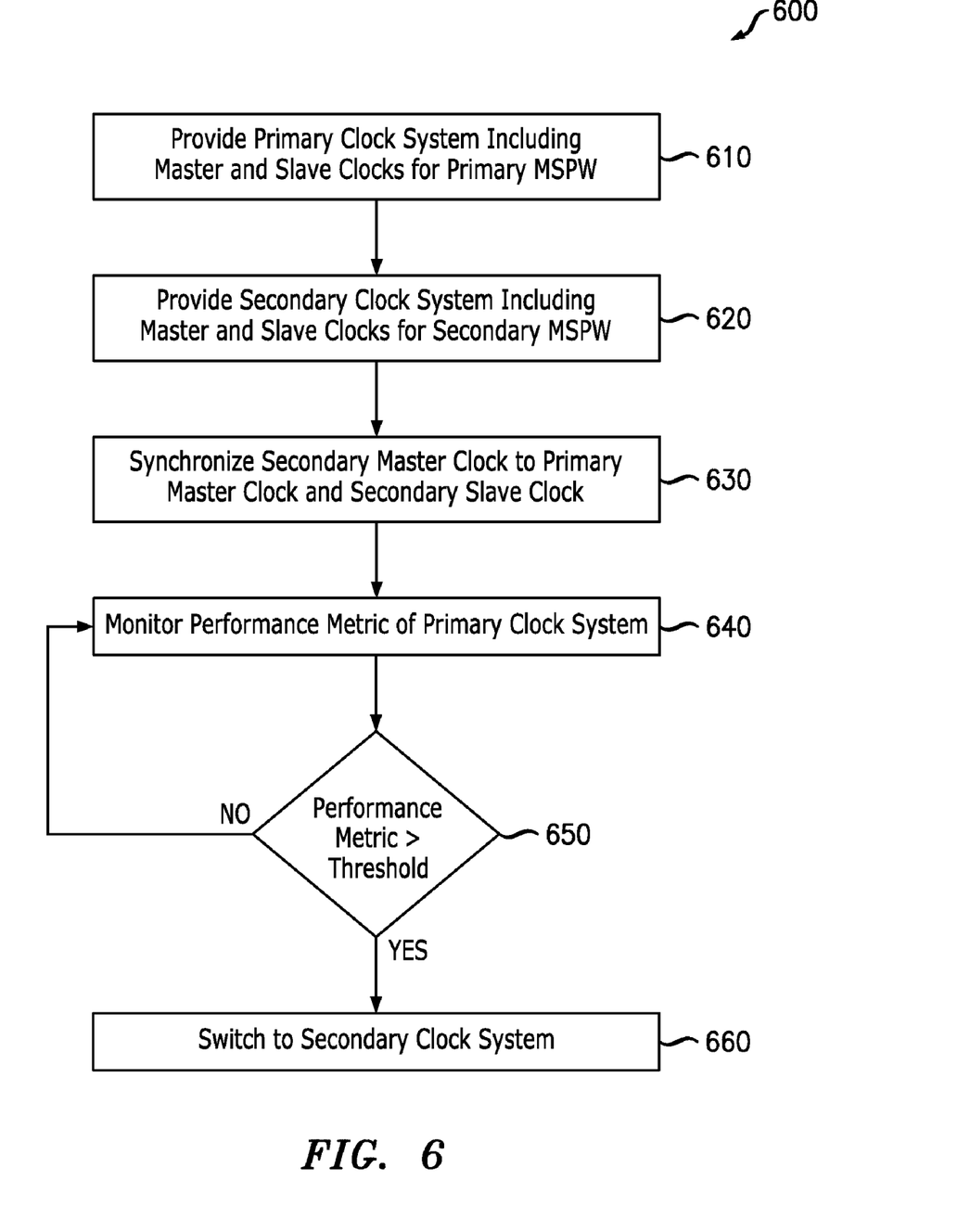
FIG. 6 is a flowchart illustrating another exemplary method for implementing the switch-over between the primary and secondary clock systems, in accordance with embodiments of the present invention.

FIG. 6 is a flowchart illustrating another exemplary method 600 for implementing a switch-over between clock systems within an IP-based mobile backhaul network, in accordance with embodiments of the present invention. Initially, at block 610, a primary clock system is provided for a primary MSPW. The primary clock system includes a master clock located on a first network node and a slave clock located on a second network node, in which the first and second network nodes are coupled via the primary MSPW. At block 620, a secondary clock system is provided for a secondary MSPW. The secondary clock system includes a master clock located on the first network node and a slave clock located on the second network node, in which the first and second network nodes are also coupled via the secondary MSPW.

At block 630, the secondary master clock and secondary slave clock are synchronized with each other. In addition, the secondary master clock may be synchronized with the primary master clock. At block 640, a performance metric, such as a loss metric or a delay metric, of the primary clock system is monitored, and if, at block 650, the performance metric exceeds a threshold, at block 660, a switch-over to the secondary clock system is performed.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

We claim:

1. A network node for an internet protocol (IP)-based mobile backhaul network, comprising:
    a primary slave clock operable to synchronize with a primary master clock via a bi-directional primary multi-segment pseudowire coupled between the network node and an additional network node on which the primary master clock is located, the primary slave clock and the primary master clock forming a primary clock system;
    a secondary slave clock operable to synchronize with a secondary master clock on the additional network node via a bi-directional secondary multi-segment pseudowire coupled between the network node and the additional network node, the secondary slave clock and the secondary master clock forming a secondary clock system; and
    a clock controller operable to maintain the secondary clock system in a hot-stand-by mode, and upon determining that a switch-over is needed, to automatically switch from the primary clock system to the secondary clock system.

2. The network node of claim 1, wherein:
    the primary multi-segment pseudowire in combination with the secondary multi-segment pseudowire forms an end-to-end redundant pseudowire connection between the network node and the additional network node; and
    the primary multi-segment pseudowire and the secondary multi-segment pseudowire each emulate a link between the network node and the additional network node to provide respective IP tunnels between the network node and the additional network node.

3. The network node of claim 1, wherein the network node is a base station and the additional network node is a radio network controller.

4. The network node of claim 1, further comprising:
    a processor operable to determine when a switch-over from the primary clock system to the secondary clock system is needed and coupled to provide an instruction to the clock controller to perform the switch-over.

5. The network node of claim 4, wherein the processor is operable to detect a failure of the primary clock system and to provide the instruction to the clock controller to perform the switch-over upon detecting the failure.

6. The network node of claim 5, wherein the processor is operable to detect a failure of the primary master clock or the primary slave clock and to provide the instruction to the clock controller to perform the switch-over upon the failure of the primary master clock or the failure of the primary slave clock.

7. The network node of claim 4, wherein the processor is operable to detect a failure of the primary multi-segment pseudowire and to provide the instruction to the clock controller to perform the switch-over upon detecting the failure.

8. The network node of claim 4, wherein the processor is operable to monitor a performance metric of the primary clock system and to provide an instruction to the clock controller to perform the switch-over based on a value of the performance metric in relation to a threshold value.

9. The network node of claim 8, wherein the performance metric is a delay metric that measures a delay or delay variation over the primary multi-segment pseudowire.

10. The network node of claim 9, wherein the processor is further operable to calculate the delay metric using delay measurement messages and delay measurement reply messages transmitted between the network node and the additional network node via the primary multi-segment pseudowire.

11. The network node of claim 8, wherein the performance metric is a loss metric that measures a loss over the primary multi-segment pseudowire.

12. The network node of claim 11, wherein the processor is further operable to calculate the loss metric using loss measurement messages and loss measurement reply messages transmitted between the network node and the additional network node via the primary multi-segment pseudowire.

13. The network node of claim 11, wherein the processor is further operable to calculate the loss metric using connectivity measurement messages transmitted between the network node and the additional network node via the primary multi-segment pseudowire.

14. The network node of claim 8, wherein the processor is further operable to monitor the performance metric on the primary multi-segment pseudowire and the secondary multi-segment pseudowire and to provide the instruction to perform the switch-over when the value of the performance metric on the primary multi-segment pseudowire exceeds the threshold value and is greater than a value of the performance metric on the secondary multi-segment pseudowire.

15. A method for implementing a switch-over between clock systems within an IP-based mobile backhaul network, comprising:
    synchronizing a primary slave clock located on a first network node with a primary master clock located on a second network node via a bi-directional primary multi-segment pseudowire coupled between the first and second network nodes, the primary slave clock and the primary master clock forming a primary clock system;
    synchronizing a secondary slave clock on the first network node with a secondary master clock on the second network node via a bi-directional secondary multi-segment pseudowire coupled between the first and second network nodes, the secondary slave clock and the secondary master clock forming a secondary clock system;
    maintaining the secondary clock system in a hot-stand-by mode;
    monitoring the primary clock system;
    determining that a switch-over from the primary clock system to the secondary clock system is needed; and
    automatically switching from the primary clock system to the secondary clock system.

16. The method of claim 15, wherein said determining that the switch-over is needed further comprises:
    detecting a failure of the primary clock system; and
    providing an instruction to perform the switch-over upon detecting the failure.

17. The method of claim 15, wherein said determining that the switch-over is needed further comprises:
    detecting a failure of the primary multi-segment pseudowire; and
    providing an instruction to perform the switch-over upon detecting the failure.

18. The method of claim 15, wherein said determining that the switch-over is needed further comprises:
    monitoring a performance metric of the primary clock system; and
    providing an instruction to perform the switch-over based on a comparison of a value for the performance metric to a threshold value.

19. The method of claim 18, wherein the performance metric is a delay metric that measures a delay or delay variation over the primary multi-segment pseudowire, and wherein said monitoring the performance metric further comprises:
calculating the delay metric using delay measurement messages and delay measurement reply messages transmitted between the first and second network nodes via the primary multi-segment pseudowire.

20. The method of claim 18, wherein the performance metric is a loss metric that measures a loss over the primary multi-segment pseudowire, and wherein said monitoring the performance metric further comprises:
calculating the loss metric using loss measurement messages and loss measurement reply messages or connectivity measurement messages transmitted between the first and second network nodes via the primary multi-segment pseudowire.

21. The method of claim 18, wherein said determining that the switch-over is needed further comprises:
monitoring the performance metric on the primary multi-segment pseudowire and the secondary multi-segment pseudowire; and
providing the instruction to perform the switch-over when the value for the performance metric on the primary multi-segment pseudowire exceeds the threshold value and is greater than a value for the performance metric on the secondary multi-segment pseudowire.

* * * * *